United States Patent
Bitan et al.

(10) Patent No.: US 12,080,008 B2
(45) Date of Patent: *Sep. 3, 2024

(54) TIME-OF-FLIGHT DEPTH MEASUREMENT USING MODULATION FREQUENCY ADJUSTMENT

(71) Applicant: SAMSUNG ELECTRONICS CO., LTD., Suwon-si (KR)

(72) Inventors: Gal Bitan, Petach-Tikva (IL); Roy Yam, Ramat Gan (IL); Gershi Koltun, Giva't Ada (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,803

(22) Filed: May 24, 2023

(65) Prior Publication Data

US 2023/0298190 A1    Sep. 21, 2023

Related U.S. Application Data

(63) Continuation of application No. 17/109,439, filed on Dec. 2, 2020, now Pat. No. 11,694,350, which is a continuation of application No. 16/401,285, filed on May 2, 2019, now Pat. No. 10,878,589.

(51) Int. Cl.
*G06T 7/50* (2017.01)
*G01S 17/10* (2020.01)
(Continued)

(52) U.S. Cl.
CPC ............. *G06T 7/521* (2017.01); *G01S 17/10* (2013.01); *G01S 17/89* (2013.01); *G06V 40/161* (2022.01);
(Continued)

(58) Field of Classification Search
CPC ........... G06T 7/521; G06T 2207/10028; G06T 2207/10048; G06T 2207/10152;
(Continued)

(56) References Cited

U.S. PATENT DOCUMENTS 7,202,941 B2    4/2007  Munro
8,218,963 B2    7/2012  Adelsberger et al.
(Continued)

OTHER PUBLICATIONS

B. Jutzi, "Investigations On Ambiguty Unwrapping Of Range Images", 2009, IAPRS, pp. 265-270.
(Continued)

*Primary Examiner* — Jonathan S Lee
(74) *Attorney, Agent, or Firm* — F. CHAU & ASSOCIATES, LLC

(57) ABSTRACT

In a method for time-of-flight (ToF) based measurement, a scene is illuminated using a ToF light source modulated at a first modulation frequency $F_{MOD}^{(1)}$. While the light is modulated using $F_{MOD}^{(1)}$, depths are measured to respective surface points within the scene, where the surface points are represented by a plurality of respective pixels. At least one statistical distribution parameter is computed for the depths. A second modulation frequency $F_{MOD}^{(2)}$ higher than $F_{MOD}^{(1)}$ is determined based on the at least one statistical distribution parameter. The depths are then re-measured using $F_{MOD}^{(2)}$ to achieve a higher depth accuracy.

20 Claims, 7 Drawing Sheets

(51) Int. Cl.
  *G01S 17/89* (2020.01)
  *G06T 7/521* (2017.01)
  *G06V 40/16* (2022.01)
  *H04N 23/56* (2023.01)
(52) U.S. Cl.
  CPC ... *H04N 23/56* (2023.01); *G06T 2207/10028* (2013.01); *G06T 2207/10048* (2013.01); *G06T 2207/10152* (2013.01); *G06T 2207/20104* (2013.01); *G06T 2207/30201* (2013.01)
(58) Field of Classification Search
  CPC . G06T 2207/20104; G06T 2207/30201; G06T 7/50; G06V 40/161; H04N 23/56; G01S 17/10; G01S 17/89
  USPC .......................................................... 348/135
  See application file for complete search history.

(56) References Cited

U.S. PATENT DOCUMENTS

| | | | |
|---|---|---|---|
| 8,629,976 B2 | 1/2014 | Hui et al. | |
| 9,578,311 B2 | 2/2017 | Hall et al. | |
| 9,681,123 B2 | 6/2017 | Perry et al. | |
| 9,702,976 B2 | 7/2017 | Xu et al. | |
| 10,755,478 B1* | 8/2020 | Zaibel | G06T 17/20 |
| 10,878,589 B2 | 12/2020 | Bitan et al. | |
| 2012/0257186 A1 | 10/2012 | Rieger et al. | |
| 2019/0394404 A1 | 12/2019 | Becker | |
| 2020/0132822 A1* | 4/2020 | Pimentel | G01S 17/86 |
| 2020/0349728 A1 | 11/2020 | Bitan et al. | |
| 2021/0174525 A1 | 6/2021 | Bitan et al. | |

OTHER PUBLICATIONS

Miles Hansard, et. al. "Time of Flight Cameras: Principles, Methods, and Applications", Springer, (103 pages).

Ryan Crabb, et. al. "Fast Time-of-Flight Phase Unwrapping and Scene Segmentation Using Data Driven Scene Priors", University Of California Santa Cruz, (146 pages).

Ryan Crabb, et. al. "Probabilistic Phase Unwrapping for Single-Frequency Time-of-Flight Range Cameras", University Of California Santa Cruz, (9 pages).

* cited by examiner

TIME-OF-FLIGHT DEPTH MEASUREMENT USING MODULATION FREQUENCY ADJUSTMENT

CROSS REFERENCE TO RELATED APPLICATIONS

This application is a continuation under 35 U.S.C. 120 of U.S. patent application Ser. No. 17/109,439, filed in the U.S. Patent and Trademark Office (USPTO) on Dec. 2, 2020, which is a continuation of U.S. patent application Ser. No. 16/401,285, filed in the USPTO on May 2, 2019, now U.S. Pat. No. 10,878,589, the contents of both of which are incorporated herein by reference in their entireties.

TECHNICAL FIELD

The present disclosure relates generally to image sensors and more particularly to time-of-flight cameras and methods for improving the quality of distance measurements to surfaces in a scene.

DISCUSSION OF THE RELATED ART

"Indirect" time-of-flight (ToF) depth measuring systems use a light source to emit a modulated light wave, where the modulating signal may be sinusoidal, a pulse train, or other periodic waveform. A ToF sensor detects this modulated light reflected from surfaces in the observed scene. From the measured phase difference between the emitted modulated light and the received modulated light, the physical distance between the ToF sensor and the scene's surfaces can be calculated. For a given distance, the measured phase shift is proportional to the modulating frequency.

In ToF vernacular, "depth" of a surface point is often used loosely to mean the distance from the surface point to a reference point of the ToF sensor, rather than a z direction component of the distance in a direction normal to an x-y image sensor plane. "Depth" and "distance" are often used interchangeably when describing ToF measurements (and these terms may be used interchangeably herein).

Indirect ToF systems should include a mechanism to prevent measurement ambiguities due to aliasing (also referred to as "depth folding"). Thus, a calculated distance corresponding to a measured phase shift of $\phi$ should be differentiated from a longer distance corresponding to a phase shift of $\phi+2\pi$, $\phi+4\pi$, etc. One way to prevent a depth folding ambiguity is to assume beforehand that no distance within the relevant portion of the scene, such as a region of interest (RoI), will be larger than a predetermined distance. The modulation frequency may then be set low enough so that no phase shift will exceed $2\pi$. However, it is known that depth measurement accuracy (referred to interchangeably as "depth quality" or "precision of depth") is inversely proportional to the modulation frequency. Consequently, the use of a single low frequency may not suffice to achieve a requisite depth quality.

Attempts have been made to remedy the above depth folding ambiguity by performing multiple measurements at two or more predetermined frequencies and/or by using measured intensity as a prior to derive depth folding probability. These techniques, however, may inflict some degree of quality degradation in the measurement, or may not realize a desired depth quality.

SUMMARY

Embodiments of the inventive concept relate to an iterative approach to achieve high depth accuracy in ToF measurements, in which measurements may be repeated using progressively increasing modulation frequencies. Each successive modulation frequency may be calculated based on a statistical distribution of the previous measurement, to efficiently arrive at a target accuracy.

In an embodiment of the inventive concept, a method for time-of-flight (ToF) based measurement involves illuminating a scene using a ToF light source modulated at a first modulation frequency $F_{MOD}^{(1)}$. While the light is modulated using $F_{MOD}^{(1)}$, depths are measured to respective surface points within the scene, where the surface points are represented by a plurality of respective pixels. At least one statistical distribution parameter is computed for the depths. A second modulation frequency $F_{MOD}^{(2)}$ higher than $F_{MOD}^{(1)}$ is determined based on the at least one statistical distribution parameter. The depths are then re-measured using $F_{MOD}^{(2)}$ to achieve a higher depth accuracy.

A time-of-flight (ToF) camera according to an embodiment includes an illuminator operable to illuminate a scene with modulated light; an image sensor comprising pixels to capture the modulated light reflected from surface points in the scene and output voltages representing the same; and an image signal processor (ISP) coupled to the illuminator and image sensor. The ISP is configured to: measure depths from the image sensor to surface points within the scene with ToF operations using a first modulation frequency $F_{MOD}^{(1)}$ at which the light is modulated; compute at least one statistical distribution parameter for the depths; determine a second modulation frequency $F_{MOD}^{(2)}$ higher than $F_{MOD}^{(1)}$ based on the statistical distribution parameter; and re-measure the depths with the light modulated at $F_{MOD}^{(2)}$.

Another method for ToF based measurement according to the inventive concept involves:
(a) performing a first iteration of depth measurement based on a first modulation frequency $F_{MOD}^{(1)}$, by illuminating a scene using a ToF light source modulated at $F_{MOD}^{(1)}$ and measuring depths to respective surface points within the scene based on a phase shift between transmitted and reflected light, the surface points being represented by a plurality of respective pixels;
(b) computing at least one statistical distribution parameter for the latest iteration of depth measurement;
(c) if the at least one statistical distribution parameter satisfies a predetermined criterion, outputting the depths measured in the latest iteration as final measured depths;
(d) if the at least one statistical distribution parameter does not satisfy the predetermined criterion, performing a next iteration of depth measurement, which comprises: determining a further modulation frequency $F_{MOD}^{(k+1)}$ higher than $F_{MOD}^{(k)}$ based on the at least one statistical distribution parameter, re-measuring the depths using $F_{MOD}^{(k+1)}$, and outputting the re-measured depths as final measured depths if a limit has been reached, where k equals 1 for the first iteration;
(e) if the limit has not been reached, incrementing k by 1 and repetitively performing (b) through (d).

BRIEF DESCRIPTION OF THE DRAWINGS

The above and other aspects and features of the inventive concept will become more apparent from the following detailed description, taken in conjunction with the accompanying drawings in which like reference numerals indicate like elements or features, wherein.

DETAILED DESCRIPTION OF EMBODIMENTS

The following description, with reference to the accompanying drawings, is provided to assist in a comprehensive understanding of certain exemplary embodiments of the inventive concept disclosed herein for illustrative purposes. The description includes various specific details to assist a person of ordinary skill the art with understanding the inventive concept, but these details are to be regarded as merely illustrative. For the purposes of simplicity and clarity, descriptions of well-known functions and constructions may be omitted when their inclusion may obscure appreciation of the inventive concept by a person of ordinary skill in the art.

Figure 1:
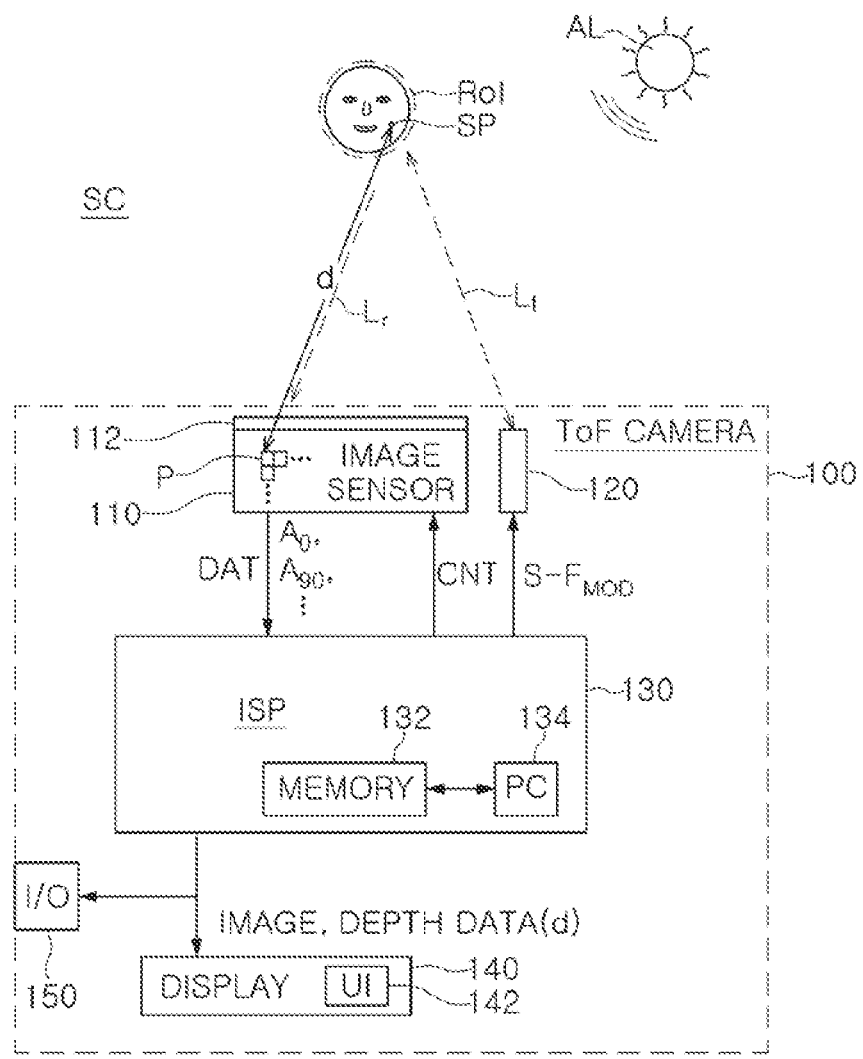
FIG. 1 is a block diagram showing elements and signals within a ToF camera according to an embodiment.

FIG. 1 is a block diagram showing elements and signals within a ToF camera, 100, according to an embodiment of the inventive concept. ToF camera 100 may include an image sensor 110, an illuminator 120, image signal processor (ISP) 130, a lens 112, a display 140 and an input/output (I/O) interface 150. ToF camera 100 may include capability for making depth measurements to surface points in a scene SC and generating a depth map representing the same. ToF camera 100 may also provide traditional camera functions, e.g., capturing still images and video of the scene suitable for display on display 140. ToF camera 100, which may be an n-tap ToF camera (e.g., n=2, 4, etc.), may be either a stand-alone camera or may be part of another apparatus such as a smart phone or a vehicle.

ToF camera 100 may activate an "RoI depth mode" to perform depth measurements over just a region of interest (RoI) within the scene, such as a face. For instance, ISP 130 may execute a face identification algorithm to automatically identify at least one face within a scene and thereby set up at least one RoI. ToF camera 100 may further include display 140 and a user interface 142 (e.g. a touch screen interface) allowing a user to manually select one or more RoIs for the RoI depth mode via user input, or to initiate automatic detection and selection of at least one RoI for the RoI depth mode (e.g. a face detection algorithm or other type of object detection algorithm). The RoI depth mode may be a mode in which depths of surface points SP within an RoI are measured at a higher accuracy than for other areas using an iterative modulation frequency adjusting technique detailed hereafter. In some embodiments, a feature may be provided in which the entire captured scene is set as the RoI, or ToF camera 100 may omit an RoI depth mode. In these latter scenarios, the depths of all surface points represented in a frame may be measured at approximately the same depth precision.

In any of the above cases, an RoI may be identified based just on ambient light $A_L$. In other examples, an RoI may be identified with the use of transmitted light $L_t$ generated by illuminator 120. Transmitted light Lt may be infrared or another suitable type of light that can be collected by image sensor 110.

Image sensor 110 may be a CCD or CMOS sensor including an array of photo sensing elements (pixels) p. Each pixel p may capture light incident through lens 112 representing the image of a surface point (region) SP in the scene. A depth measurement may measure a distance d between the corresponding surface point and a point of reference of the image sensor 110 (e.g., the distance to the pixel itself). Herein, "depth" refers to this distance d between the image sensor reference point and the surface point SP. As noted earlier, the terms "depth" and "distance" may herein be used interchangeably when discussing ToF systems.

According to the inventive concept, once an RoI is identified, the pixels associated with that RoI are selected for iterative depth measurements, where each iteration provides a more precise measurement. For each depth measurement, illuminator 120 transmits rays of transmitted light Lt, and reflected light Lr from a surface point SP is accumulated by a respective pixel p. In the first depth measurement in the iterative process, the transmitted light Lt is modulated at a lowest frequency $F_{MOD}$, and in subsequent measurements, $F_{MOD}$ is increased based on statistics of the previous measurement. ISP 130 may output a signal $S\text{-}F_{MOD}$ controlling circuitry within illuminator 120 to modulate the light Lt at the intended frequency. It is noted that ISP 130 may include a memory 132 coupled to a plurality of processing circuits (PC) 134. The memory 132 may store interim and final measurement data as well as program instructions read and executed by PC 134 for performing the various processing and operational/control tasks described herein.

Figure 2:
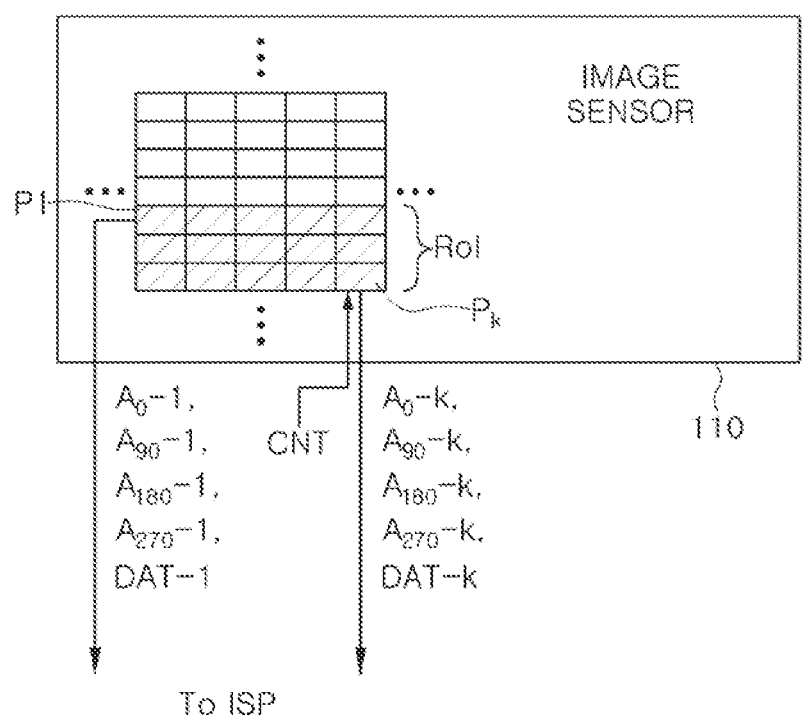
FIG. 2 illustrates pixels and signals of an image sensor that may be used within a ToF camera according to an embodiment.

FIG. 2 illustrates pixels and signals that may be used within image sensor 110. A set of pixels representing an RoI, such as pixels p1 to pk, may be identified by ISP 130. When ISP 130 selects a frequency $F_{MOD}$ at which to modulate the light Lt of illuminator 120, ISP 130 may concurrently output one or more control signals CNT (FIG. 1) synchronized with the modulation signal $S\text{-}F_{MOD}$ to each pixel p1 to pk. Control signals CNT may be routed to one or more switches within the individual pixels to control the timing at which memory elements within the pixels (e.g. capacitors or a digital counter of a digital timing imager) accumulate charge or generate a count representing the magnitude of the incoming light. In response to the control signals CNT, each pixel $p_i$ (i=any integer) within the RoI may output one or more voltages representing the incident light energy, hereafter referred to as "amplitudes". The amplitudes may be, e.g. analog voltages at capacitors used as memory elements, or digital codes in the case of digital timing imagers. The amplitudes may be output in a quad scheme of four amplitudes A0-i, A90-i, A180-i, A270-i each representing charge accumulated in that pixel $p_i$ during a respective phase portion of a modulation cycle based on $F_{MOD}$. Depth associated with the pixel $p_i$ may then be computed by ISP 130 based on the relative strengths of these amplitudes. It should be noted that depending on the pixel configuration, an individual pixel $p_i$ may output more than one of the amplitudes, or only one amplitude. In the latter case, four adjacent pixels of a four-pixel square may each output one of the four amplitudes, and the depth image value at each pixel may rely on the amplitude data from that pixel and its neighbors.

In some embodiments, image sensor 110 is used for both depth measurement and imaging, in which case any pixel $p_i$ is also configured to collect and output display data DAT-i to display 140. In other embodiments, the pixels are dedicated just for depth measurement and do not output display data (e.g., another image sensor may be dedicated for this function). In still other implementations, ISP 130 processes the depth measurements to generate an image for display (e.g. on display 140).

Figure 3:
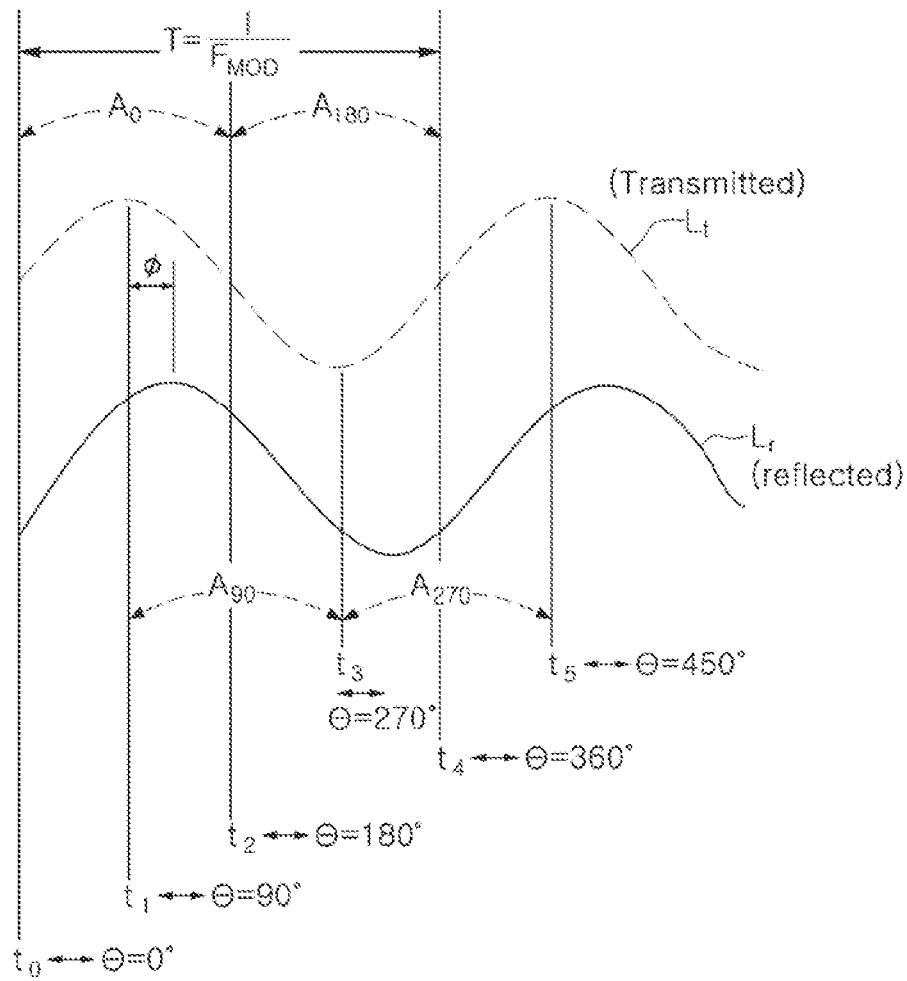
FIG. 3 is a graph showing a relationship between example emitted and reflected modulated light waves of a 2-tap ToF camera and time intervals for making depth measurements.

FIG. 3 is a graph showing an example relationship between emitted and reflected light waves of ToF camera 100 (embodied as a 2-tap ToF camera), and time intervals for making depth measurements. Emitted wave Lt contains light energy continuously modulated at the modulation frequency $F_{MOD}$ having a period $T=1/F_{MOD}$ (note that the envelope of the resulting modulated light is shown in FIG. 3). Light from reflected wave Lr is collected by a pixel p. By the time pixel p receives the reflected wave Lr, it is shifted in phase with respect to the emitted wave Lt by a phase shift $\phi$ proportional to the depth d, allowing for computation of d based on the measured $\phi$. In a quad measurement scheme, four amplitudes are used to compute the depth d for enhanced accuracy. Assuming a reference phase $\Theta$ of the transmitted wave Lt, the period T begins at time $t0 \leftrightarrow \Theta=0°$ and ends at time $t4 \leftrightarrow \Theta=360°$. A first amount of charge due to the reflected wave Lr may be accumulated in a capacitor of the pixel, or represented by a digital counter, between times t0 to t2 (from $\Theta=0°$ to 180°) and a measurement of this amount of charge/count may be taken at time t2 to obtain a first amplitude A0. The actual measurement is taken by accumulating charge or counting light over many periods T of the modulation signal, e.g. by repetitive on-off switching of a switch coupled to a capacitor between times t0 and t2 of each period. (For example, time t4 in FIG. 3 may be considered time t0 of the next period, and so on.) A second amount of charge may be accumulated in a different capacitor of the pixel, or digitally counted between times t1 to t3 (from $\Theta=90°$ to 270°) and a measurement of this amount of charge/count may be taken at time t3 to obtain a second amplitude A90. Similar measurements may be taken at times t4 and t5 to obtain respective third and fourth amplitudes A180 and A270. The amplitudes are received by ISP 130, which may then calculate the phase shift $\phi$ as $$\varphi = \arctan\left(\frac{A_{270} - A_{90}}{A_0 - A_{180}}\right) + 2\pi k, k = 0, 1, 2. \qquad \text{eqn. (1)}$$

The depth d is proportional to the phase shift and may be computed as:

$$d = \frac{c}{4\pi F_{MOD}} \varphi \qquad \text{eqn. (2)}$$

where c is the speed of light.

If a single modulation frequency $F_{MOD}$ were to be used for the entire depth measurement, a tradeoff would exist between the depth quality ("precision of depth") and the maximal depth range without aliasing ambiguity ("maximal range"). For a single modulation frequency case, the maximal range, also known as ambiguity range (Ra), is the range at which the phase shift $\phi=2\pi$, i.e., $$R_a = \frac{c}{2F_{MOD}}. \qquad \text{eqn. (3)}$$

It is also considered that precision of depth is proportional to the inverse of the modulation frequency $F_{MOD}$ as follows:

$$\delta d \propto \frac{1}{F_{MOD}} \qquad \text{eqn. (4)}$$

where $\delta d$ is depth error, i.e., an amount by which the measured depth d may differ from the actual depth (note—herein, $\delta$ is a notation for error in a given parameter).

Accordingly, in the single frequency case, if measurements are made at a low frequency ($F_{MOD}$), the maximal range is large but depth quality is low. Conversely, if measurements are made with $F_{MOD}$ set to a high frequency, this improves depth quality but reduces maximal range.

To eliminate the above tradeoff and achieve higher depth quality with a large maximal range, a method of the inventive concept uses at least two iterations of measurement. A first iteration uses a low frequency with an associated large maximal range, to obtain a coarse depth measurement. Since depth quality in ToF systems is proportional to the modulation frequency as just mentioned, this first measurement may have low quality for the RoI in the observed scene. The second iteration selects a higher frequency such that its corresponding ambiguity range is derived from the precision of the previous iteration, to cover a measurement error of the previous iteration. Additional iteration frequencies can be derived from the remaining uncertainty in the depth measurement until acceptable quality is acquired.

Figure 4:
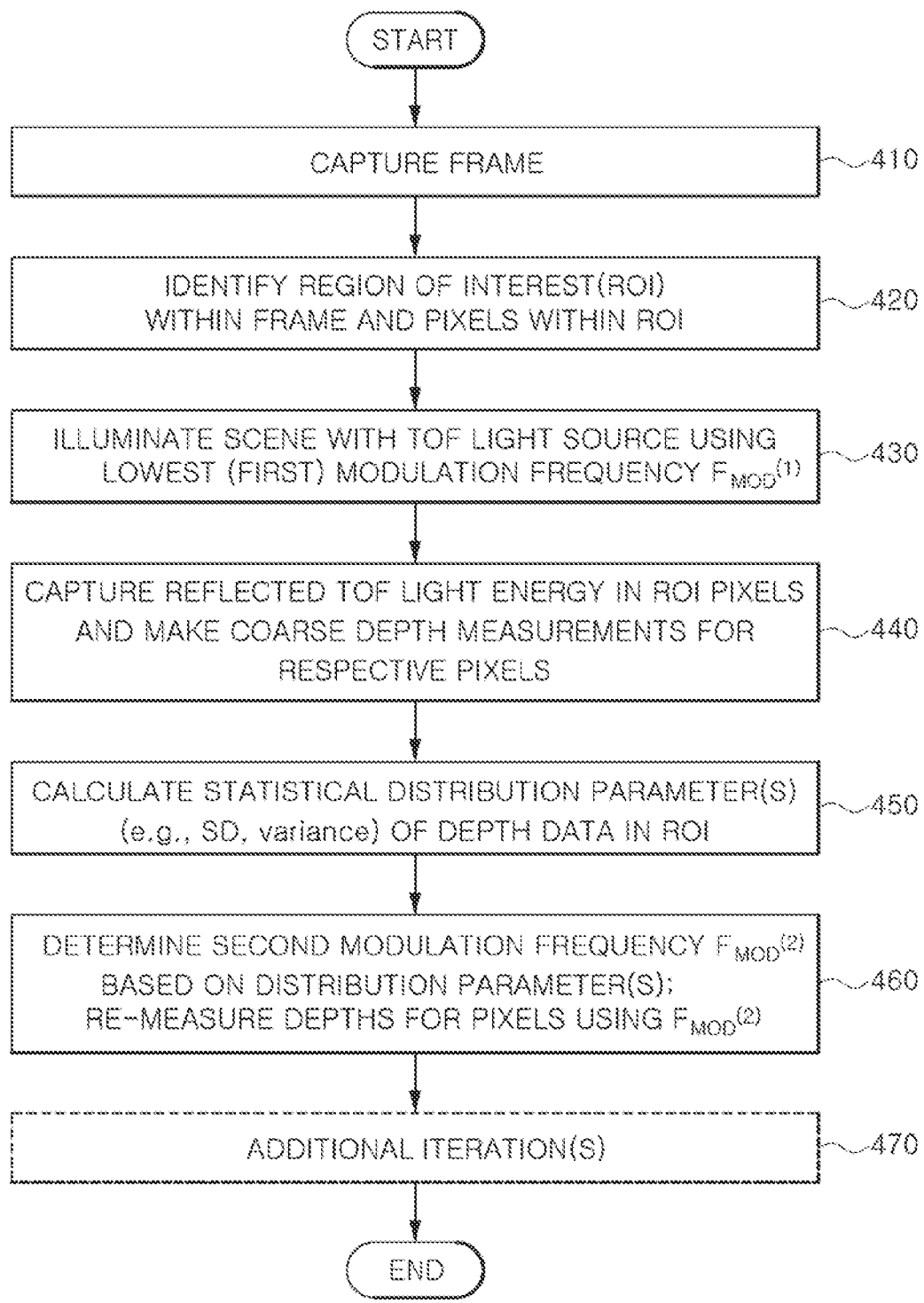
FIG. 4 is a flow chart illustrating an operating method for making ToF depth measurements according to an embodiment.

FIG. 4 is a flow chart depicting an operating method by which ToF camera 100 may make depth measurements according to an embodiment of the inventive concept. The method may be performed under the overall control of ISP 130. ToF camera 100 may first capture (410) a frame of a scene illuminated by ambient light. A region of interest (RoI) and the pixels corresponding thereto may then be identified (420) within the frame. Operations 410 and 420 may be performed using any suitable conventional or unconventional approach. As discussed above, in some cases an RoI may encompass the pixels of an entire frame, and in other cases, a particular region such as an identified face or object. Note that an RoI may also include disparate regions such as multiple identified faces, while excluding other regions of the frame.

Once the RoI is identified, the scene may be illuminated (430) by illuminator 120, using a ToF light source modulated at lowest (first) frequency $F_{MOD}^{(1)}$ (where the superscript $^{(1)}$ variously annexed to variables herein denotes association with the first measurement iteration). As mentioned, ISP 130 may output a modulation signal S-fmod to illuminator 120 to modulate the light source at the frequency $F_{MOD}$. The first frequency $F_{MOD}^{(1)}$ may be selected by ISP 130 as a frequency low enough to attain a desired first maximal depth range $Ra^{(1)}$ of:

$$R_a^{(1)} = \frac{c}{2F_{MOD}^{(1)}}, \qquad \text{eqn. (5)}$$

so that, $$F_{MOD}^{(1)} = c/(2Ra^{(1)}).$$

Here, the first maximal depth range $Ra^{(1)}$ may be understood as the maximum depth that may be measured without any aliasing ambiguity. For example, user interface 142 of ToF camera 100 may allow the user to select a maximum range $Ra^{(1)}$ for performing accurate depth measurements, or, a default maximum range may be set. ISP 130 may then select the first frequency $F_{MOD}^{(1)}$ corresponding to $Ra^{(1)}$ according to eqn. (5).

Reflected ToF light energy may then be captured in the RoI pixels, and coarse depth measurements may be made for the respective pixels (440) by ISP 130. For instance, ISP 130 may compute a phase shift between the emitted and reflected light as:

$$\varphi_p^{(1)} = a\tan\left(\frac{A1_p^{(1)} - A3_p^{(1)}}{A2_p^{(1)} - A0_p^{(1)}}\right) \qquad \text{eqn. (6)}$$

where p is a pixel inside an RoI having N pixels; $\phi p^{(1)}$ is a phase shift measurement using the first modulation frequency $F_{MOD}^{(1)}$ at pixel p; and $A0p^{(1)}$, $A1p^{(1)}$, $A2p^{(1)}$ and $A3p^{(1)}$ may be the above-discussed amplitudes A0, A90, A180 and A270, respectively, measured for pixel p when the first frequency $F_{MOD}^{(1)}$ is used.

A coarse (first) depth $dp^{(1)}$ measured for a pixel p may be determined by ISP 130 as:

$$d_p^{(1)} = \frac{c}{4\pi F_{MOD}^{(1)}} \varphi_p^{(1)} \qquad \text{eqn. (7)}$$

First depth measurements may be performed in this manner for each of the pixels within the RoI. One or more statistical distribution parameters such as standard deviation $\sigma$ and variance $\sigma^2$ may then be calculated (450) for the first depth data in the RoI. Based on the distribution parameter(s), a second, higher modulation frequency $F_{MOD}^{(2)}$ may be determined, and depths of the pixels may be re-measured for the RoI pixels using $F_{MOD}^{(2)}$ The frequency $F_{MOD}^{(2)}$ may be set to a value inversely proportional to a first standard deviation, $\sigma^{(1)}$, that was measured when $F_{MOD}^{(1)}$ was used. For instance, if $\sigma^{(1)}$ is large, this may be indicative of a high noise level and/or poor signal/noise (s/n) ratio in the RoI, resulting in $F_{MOD}^{(2)}$ being set just slightly higher than $F_{MOD}^{(1)}$. On the other hand, if $\sigma^{(1)}$ is small, the s/n ratio may be high, whereby $F_{MOD}^{(2)}$ may be set higher than the former case. In either case, since $F_{MOD}^{(2)}$ is higher than $F_{MOD}^{(1)}$, as explained above, depth of precision is improved in the second iteration using the higher frequency $F_{MOD}^{(2)}$.

The first standard deviation $\sigma^{(1)}$ may be computed as:

$$\sigma^{(1)} = \sqrt{\frac{\sum_{p \in RoI}(dp - \mu)^2}{N-1}} \qquad \text{eqn. (8)}$$

where $\mu$ is computed by ISP 130 as the mean value of dp over the RoI, and N is the number of pixels within the RoI.

In an alternative implementation, ISP 130 obtains $\sigma^{(1)}$ according to:

$$\sigma^{(1)} = \frac{1}{N}\sum_{p \in RoI} \delta d_p^{(1)} \qquad \text{eqn. (9)}$$

where $\delta dp^{(1)}$ is the above-noted depth error, i.e., an amount that the measured value for $dp^{(1)}$ differs from the actual depth. Here, the depth error $\delta d^{(1)}$ in each phase Ai may be found as:

$$\delta d_i^{(1)}(\text{each phase}) = \frac{c\sqrt{\gamma T}}{8\sqrt{2}\pi F_{MOD}} \frac{\sqrt{B}}{Ai} \qquad \text{eqn. (10)}$$

where B is the ambient light intensity measured by an average of all phases on a certain pixel and may be determined by $B=(\frac{1}{4})(A0p^{(1)}+A1p^{(1)}+A2p^{(1)}+A3p^{(1)})$; $T=1/F_{MOD}^{(1)}$; and $\gamma$ is a parameter that is measurable on a given image sensor as the proportion between the noise and the square root of the intensity. The final result for depth error $\delta dp^{(1)}$ (over all phases) may be obtained as the average of $\delta d_i$ over the four phases $A=A0p^{(1)}$, $A1p^{(1)}$, $A2p^{(1)}$ and $A3p^{(1)}$.

The rationale for the selection of $F_{MOD}^{(2)}$ may be understood by first considering that a second ambiguity range $Ra^{(2)}$ is a range smaller than the first ambiguity range $Ra^{(1)}$. The length of range $Ra^{(2)}$ may be set as:

$$R_a^{(2)} = \alpha \sigma^{(1)} \qquad \text{eqn. (11)}$$

where $\alpha$ is a variable that may be a predetermined constant. The variable $\alpha$ may be a user defined variable that corresponds to user preference to trade off measurement confidence vs. convergence speed to complete the overall depth measurement. Convergence speed may be proportional to the number of depth measurement iterations performed with progressively higher modulation frequencies. The variable $\alpha$ may be decided by the user depending on the specific system, maximum tolerable error and/or application. A high $\alpha$ will extend the region (e.g. the range $Ra^{(2)}$ in FIGS. 5 and 6 discussed below) resulting from the measurements with the first frequency $F_{MOD}^{(1)}$, which may result in relatively low resolution of measurements with the second frequency $F_{MOD}^{(2)}$. On the other hand, low $\alpha$ values may not provide a high degree of certainty that the true depth (e.g., "$dp^{(0)}$" in FIGS. 5 and 6) lies within the region that will be subdivided (as illustrated in FIG. 6) in association with the second frequency $F_{MOD}^{(2)}$. As one non-limiting example, $\alpha$ may be in a range of about (0.9 to 1.5). It is noted here that the user interface 142 may permit a user selection of $\alpha$.

$F_{MOD}^{(2)}$ may be computed as:

$$F_{MOD}^{(2)} = c/(2Ra^{(2)}) \qquad \text{eqn. (12).}$$

Figure 5:
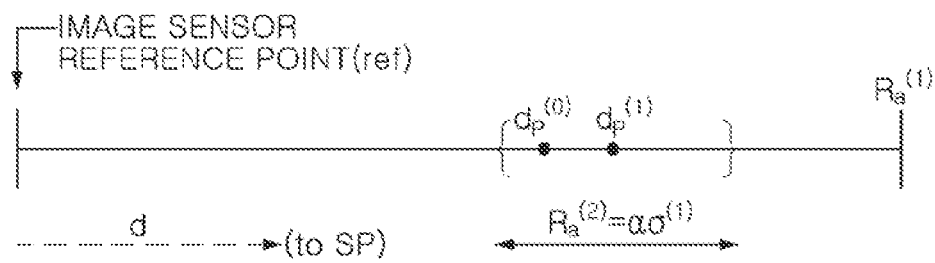
FIG. 5 graphically illustrates an example relationship between first and second ambiguity ranges.
Figure 6:
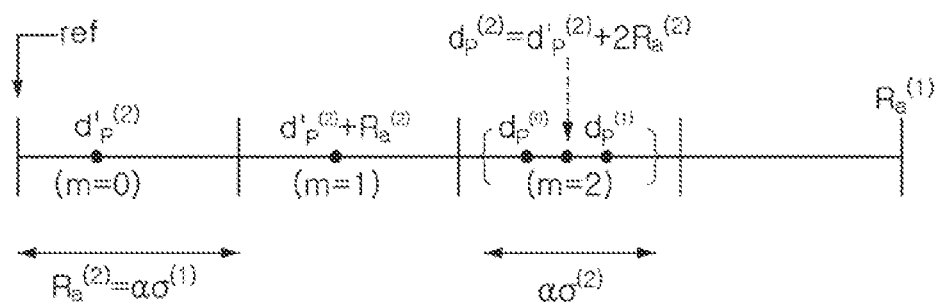
FIG. 6 graphically illustrates how aliasing ambiguity is removed for a depth measurement repeated for the same surface point but using a second modulation frequency.

FIG. 5 graphically illustrates an example relationship between the first and second ambiguity ranges $Ra^{(1)}$ and $Ra^{(2)}$. FIG. 6 graphically illustrates how aliasing ambiguity may be removed for a depth measurement repeated for the same surface point but using the second modulation frequency $F_{MOD}^{(2)}$.

As shown in FIGS. 5 and 6, since $F_{MOD}^{(2)} > F_{MOD}^{(1)}$ and $Ra^{(2)} < Ra^{(1)}$, when a depth measurement is taken using $F_{MOD}^{(2)}$ for the same surface point SP as was just measured using $F_{MOD}^{(1)}$, there is an aliasing (depth fold) ambiguity in the measurement using $F_{MOD}^{(2)}$. This is because the surface point SP is assumed to be a point located at a distance from the reference point (ref) of the image sensor anywhere in the range of 0 to $Ra^{(2)}$.

Thus, a calculation is made to differentiate between a distance corresponding to a phase shift $\phi > 2\pi$ vs. $\phi < 2\pi$ to eliminate aliasing ambiguity. Assume "$d'p^{(2)}$" is a "wrapped phase" depth calculated based on a measured "wrapped" phase $\phi p^{(2)}$ when $F_{MOD}^{(2)}$ is used. (A wrapped phase is a measured phase that is always <$2\pi$. A wrapped phase may have removed multiples of 2π due to depth folds. For instance, an unwrapped phase of 450° equates to a wrapped phase of 90°.) The actual distance measurement $dp^{(2)}$ may then be found by adding a number of depth folds that occurred for that measurement to the depth $d'p^{(2)}$. The number of depth folds may be found by determining a variable "m" for which the distance $(d'p^{(2)}+mRa^{(2)})$ is closest to the previous depth measurement $dp^{(1)}$. In the example of FIG. 6, it is seen that when m=2, the distance $(d'p^{(2)}+2Ra^{(2)})$ is closer to $dp^{(1)}$ than for cases of m=0 and m=1. Therefore, the measurement result $dp^{(2)}$ in this example is: $dp^{(2)}=d'p^{(2)}+2Ra^{(2)}$. FIG. 6 also exemplifies that $dp^{(2)}$ is closer to the actual distance $dp^{(0)}$ than for the case of $dp^{(1)}$ in the example of FIG. 5. This illustrates how depth accuracy may be improved in a subsequent measurement iteration.

Formally, the phase shift $\phi p^{(2)}$ for a pixel based measurement in the second iteration, using the second modulation frequency $F_{MOD}^{(2)}$, may be found as:

$$\varphi_p^{(2)} = a\tan\left(\frac{A1_p^{(2)} - A3_p^{(2)}}{A2_p^{(2)} - A0_p^{(2)}}\right) \quad \text{eqn. (13)}$$

where the superscript $^{(2)}$ denotes the second iteration for each variable. Depth according to the second iteration may then be calculated considering the aliasing fold at $R_a^2$:

$$d_p^{(2)} = \left\{ d_p^{'(2)} + mR_a^{(2)} \,\middle|\, \min_m \left(d_p^{(1)} - d_p^{'(2)} - mR_a^{(2)}\right)\right\} \quad \text{eqn. (14)}$$

where:

$$d_p^{'(2)} = \frac{c}{4\pi F_{MOD}^{(2)}} \varphi_p^{(2)}. \quad \text{eqn. (15)}$$

Accordingly, the depth measurement for a pixel in the second iteration, i.e., using $F_{MOD}^{(2)}$, may be carried out in the manner just described. Referring still to FIG. 4, in some embodiments the measurement is considered completed after a fixed number of iterations, regardless of other considerations. For example, in one embodiment, the measurement may be complete after the second iteration (operation 460 completes the process) without assessing whether further accuracy should be attempted. In other embodiments, at least one additional iteration is performed (470), in which depths are re-measured. Each iteration may use a progressively higher modulation frequency, based on a computed statistical distribution of the previous measurement, and achieve a progressively higher precision of depth.

Figure 7:
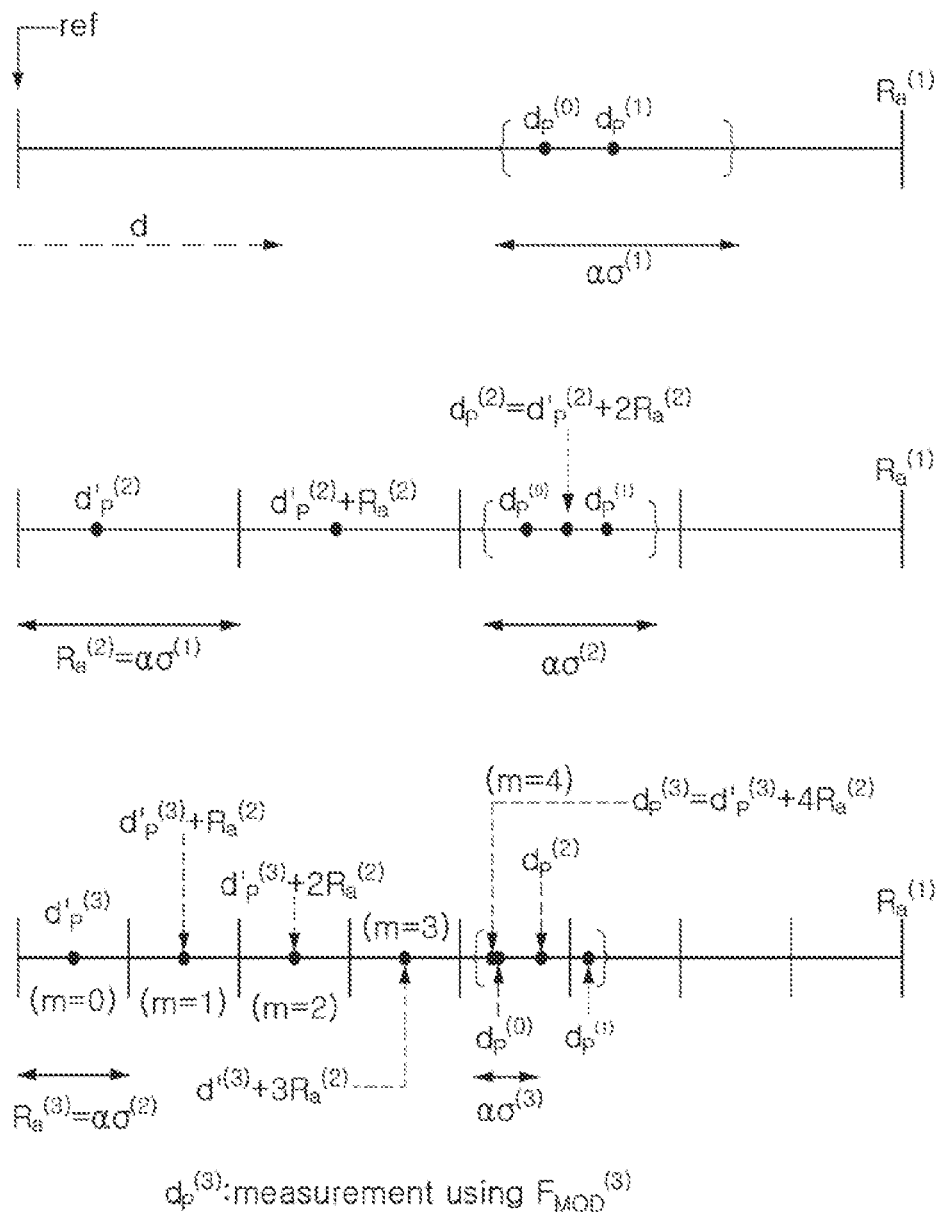
FIG. 7 depicts how a third iteration may further improve the accuracy of the measurement example of FIG. 6.

For instance, FIG. 7 graphically illustrates how a third iteration may further improve the accuracy of the measurement example of FIG. 6. In this case, a third modulation frequency $F_{MOD}^{(3)}$ is determined based on the standard deviation $\sigma^{(2)}$ measured in the second iteration (when $F_{MOD}^{(2)}$ was used) according to:

$$F_{MOD}^{(3)}=c/(2Ra^{(3)}) \quad \text{eqn. (16)}$$

where $$R_a^{(3)}=\alpha\sigma^{(2)} \quad \text{eqn. (17)}$$

A third (wrapped) phase shift $\phi p^{(3)}$ may then be measured, and a third depth $dp^{(3)}$ determined according to:

$$d_p^{(3)} = \left\{ d_p^{'(3)} + mR_a^{(3)} \,\middle|\, \min_m \left(d_p^{(2)} - d_p^{'(3)} - mR_a^{(3)}\right)\right\} \quad \text{eqn. (18)}$$

where:

$$d_p^{'(3)} = \frac{c}{4\pi F_{MOD}^{(3)}} \varphi_p^{(3)}. \quad \text{eqn. (19)}$$

In the example shown in FIG. 7, the correct value of "m" is 4 (the value of m that adds the correct number of depth folds to the $d'p^{(3)}$ measurement). This results in $dp^{(3)} = (d'^{(3)}+4\,Ra^{(3)})$, a distance exemplified as being still closer to an actual distance $dp^{(0)}$. Thus, it is seen that depth quality may improve with each additional iteration.

In the above examples, a fixed number of depth measurement iterations may be predetermined according to the application. In other embodiments, discussed below, the total number of iterations may depend on the latest statistical distribution result. A principal number N of iterations can be determined by measurement conditions (e.g. relative depth errors occurring in each iteration) and target accuracy.

Figure 8:
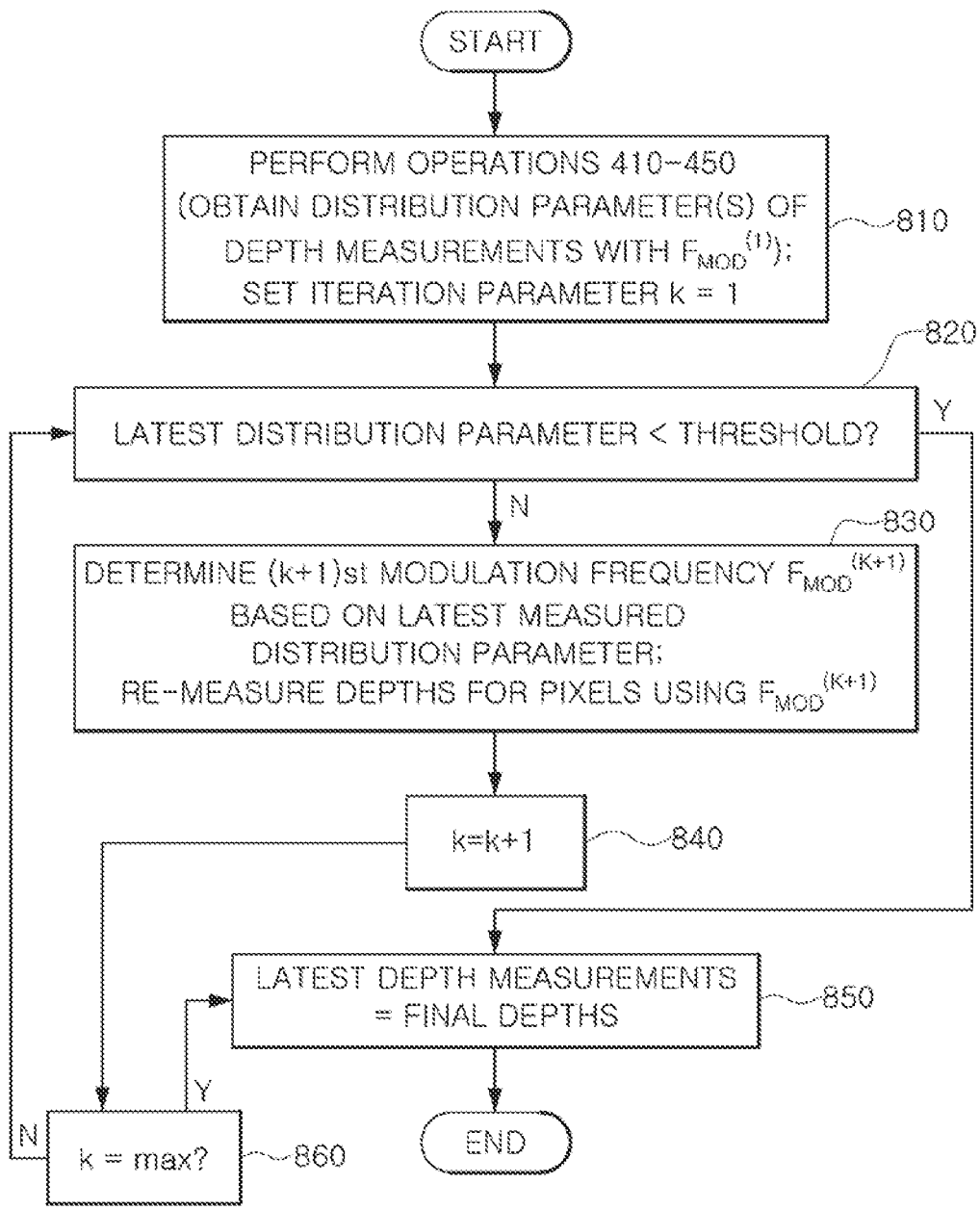
FIG. 8 is a flow chart illustrating a ToF measurement method according to an embodiment in which the number of iterations is allowed to vary depending on statistical distribution results of the measurements.

FIG. 8 is a flow chart illustrating a ToF measurement method according to an embodiment. In this embodiment, the total number of iterations is allowed to vary depending on statistical distribution results of the measurements. The method may first perform (810) operations 410-450, which obtains depth measurements using the first modulation frequency $F_{MOD}^{(1)}$ and its associated distribution parameter(s). Further, at this stage an iteration parameter "k" may be initially set to 1. At this point, the method may determine (820) whether the latest distribution parameter is below a threshold corresponding to a target precision of depth. If Yes, a target accuracy may be satisfied the latest depth measurements may be considered the final measured depths (850); and the measurement process may end. In an example, the standard deviation $\sigma p$ is the distribution parameter, and if it is below a threshold $\sigma_{THR}$, this indicates a target accuracy has been satisfied.

If, however, $\sigma p > \sigma_{THR}$ (No at 820), at least one further iterative measurement is performed. To this end, the (k+1)st modulation frequency $F_{MOD}^{(k+1)}$ may be determined (830) based on the latest measured distribution parameter, and the depths re-measured for the pixels in the RoI using $F_{MOD}^{(k+1)}$. The iteration parameter k may then be incremented by 1 (840). Using a stop mechanism, if k equals a predetermined maximum (860) with the current iteration, the latest depth measurements may be considered the final measured depths (850), and the process ends. Otherwise, the flow returns to 820 and the process repeats, whereby more measurement iterations may occur.

An example iterative algorithm for the method of FIG. 8 may be summarized by the following pseudocode:

$$d_p^{(1)} = \frac{c}{4\pi F_{MOD}^{(1)}} \varphi_p^{(1)}; \; \sigma^{(1)} = \frac{1}{N}\sum_{p \in RoI} \delta d_p^{(1)}, \text{ or}$$

$$\sigma^{(1)} = \sqrt{\frac{\sum_{p \in RoI}(dp(1)-\mu)^2}{N-1}}$$

k = 1
while $\sigma^{(k)} > \sigma_{THR}$:

$$R_a^{(k+1)} = \alpha\sigma^{(k)} \to F_{MOD}^{(k+1)} = \frac{c}{2\alpha\sigma^{(k)}}$$

-continued

Take measurement of $\varphi_p^{(k+1)}$ with $F_{MOD}^{(k+1)}$ $$d_p'^{(k+1)} = \frac{c}{4\pi F_{MOD}^{(k+1)}} \varphi_p^{(k+1)}$$

$$d_p^{(k+1)} = \left\{ d_p'^{(k+1)} + mR_a^{(k+1)} \mid \min_m \left( d_p^{(k+1)} - d_p'^{(k+1)} - mR_a^{(k+1)} \right) \right\}$$

$$\sigma^{(k+1)} = \frac{1}{N} \sum_{p \in RoI} \delta d_p^{(k+1)}, \text{ or } \sigma^{(k+1)} = \sqrt{\frac{\sum_{p \in RoI}(dp(k+1)-\mu)^2}{N-1}}$$

k = k + 1
Take depth measurment – $d_p^{(k)}$.

As mentioned earlier, the variable α in the above examples may be a user defined variable that corresponds to user preference to trade off measurement confidence vs. convergence speed to complete the overall depth measurement. To facilitate an understanding of this concept, an example will be presented below illustrating how the value of alpha may affect ambiguity and convergence speed. The example assumes the first frequency $F_{MOD}^{(1)}$ is 20 MHz (corresponding to 7.5 m ambiguity range) and the measured standard deviation σ is 1 m (13% of ambiguity). This may equate to a probability of the actual depth being within 1 m of the measured depth (e.g. 4 m) of ~68% (under the probable assumption that the depth error is normally distributed). In this case a high value of α (α=2) may be considered. This selection may require the ambiguity range of the second frequency $F_{MOD}^{(2)}$ to cover 4 m. As a result, the error of the second measurement will be 53 cm (13% of 4 m). If the desired accuracy is 10 cm (0.01 m), it will take 4 iterations of frequency adjustment as illustrated in Table 1:

TABLE I

| Iteration | Ambiguity [m] (x4 previous error) | Error [m] (13% of ambiguity) |
| --- | --- | --- |
| #0 | 7.5 | 1 |
| #1 | 4 | .53 |
| #2 | 2.12 | .28 |
| #3 | 1.12 | .15 |
| #4 | .6 | .08 |

However, at each iteration there may be a 95% chance that the true depth is actually covered by the adjusted frequency. Overall this gives an 81% confidence in the result.

Alternatively, a low alpha value (alpha=0.5) may be considered. This selection would require the ambiguity range of the second frequency $F_{MOD}^{(2)}$ to cover 1 m. As a result the error of the second measurement will be 13 cm (13% of 4 m). If the desired accuracy is 10 cm (0.01 m) it will take only 2 iterations of frequency reduction, as illustrated in Table II:

TABLE II

| Iteration | Ambiguity [m] (x1 previous error) | Error [m] (13% of ambiguity) |
| --- | --- | --- |
| #0 | 7.5 | 1 |
| #1 | 1 | .13 |
| #2 | .13 | .0169 |

However, at each iteration in this case there is only a 38% chance that the true depth is actually covered by the adjusted frequency. Overall this gives a 14% confidence in the result. Accordingly, this example illustrates how the choice of alpha may trade off measurement confidence vs. the convergence speed (correlated with the number of iterations) to complete the overall depth measurement.

In the above-described examples, the standard deviation σ was used as the statistical distribution parameter as a basis for assessing whether another iteration should be performed, and for determining the frequency of modulation in the next iteration. In other examples, at least one other distribution parameter such as the variance $\sigma^2$ may be used alternatively or as an additional factor.

Embodiments of the inventive concept such at those described above use an iterative depth measurement with an optimized frequency, in light of the previous measurements, to best suit a given observed scene, or a specific RoI within the scene. As a result, the following advantages may be realized as compared to conventional techniques that utilize a predetermined set of frequencies for multiple measurements:

1) High depth quality—embodiments may provide a high quality depth measurement on an RoI of the scene.
2) Depth range—embodiments have no quality-range tradeoff. There may be no compromise in depth quality when a long measuring range is required.
3) Unfolding—embodiments do not suffer from depth unfolding errors that can lead to large measurement offsets.
4) Specific applications improvement—embodiments may improve performance in applications such as face ID, face avatar, augmented reality (AR), virtual reality (VR) and extended reality (XR).

The processing of the methods described above may each be performed by at least one processor (e.g. embodied as processing circuits 134) within image signal processor (ISP) 130. The at least one processor may be dedicated hardware circuitry, or, at least one general purpose processor that is converted to a special purpose processor by executing program instructions loaded from memory (e.g. memory 132).

Exemplary embodiments of the inventive concept have been described herein with reference to signal arrows, block diagrams and algorithmic expressions. Each block of the block diagrams, and combinations of blocks in the block diagrams, and operations according to the algorithmic expressions can be implemented by hardware (e.g. processing circuits 134) accompanied by computer program instructions. Such computer program instructions may be stored in a non-transitory computer readable medium (e.g. memory 132) that can direct a computer, other programmable data processing apparatus, or other devices to function in a particular manner, such that the computer readable medium is an article of manufacture including instructions which implement the function/act specified in the flowchart and/or block/schematic diagram.

The term "processor" as used herein is intended to include any processing device, such as, for example, one that includes a central processing unit (CPU) and/or other processing circuitry (e.g., digital signal processor (DSP), microprocessor, etc.). Moreover, a "processor" includes computational hardware and may refer to a multi-core processor that contains multiple processing cores in a computing device. Various elements associated with a processing device may be shared by other processing devices.

While the inventive concept described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. An apparatus comprising:
a touchscreen interface configured to select a region of interest (RoI) of a scene; and
at least one time-of-flight (ToF) camera,
wherein the at least one ToF camera comprises:
an illuminator configured to illuminate a scene with modulated light;
an image sensor configured to capture the modulated light reflected from surface points in the scene; and
an image signal processor configured to identify the RoI through the touchscreen interface in a second ToF measurement of the RoI, measure depths of the RoI by performing ToF operations using the modulated light and output depth information with a precision different from a first ToF measurement of the RoI.

2. The apparatus of claim 1, wherein the RoI is measured at a higher degree of accuracy than other areas of the scene in the second ToF measurement.

3. The apparatus of claim 1, wherein accuracy of the second ToF measurement is higher than accuracy of the first ToF measurement.

4. The apparatus of claim 3, wherein the image signal processor controls the accuracy of the second ToF measurement by adjusting a modulation frequency of the modulated light.

5. The apparatus of claim 1, wherein the image signal processor measures first depths of the RoI based on a first ToF light source in the first ToF measurement and second depths of the RoI based on a second ToF light source in the second ToF measurement, and determines a second modulation frequency based on at least one statistical distribution parameter for the first depths,
wherein the second modulation frequency is different from the first modulation frequency.

6. The apparatus of claim 1, wherein the ToF camera is configured as a stand-alone camera or an n-tap ToF camera, where n is two or four.

7. The apparatus of claim 1, wherein the ToF camera further comprises an image sensor having a pixel array,
wherein pixels of the pixel array corresponding to the RoI are selected for iterative depth measurements, where each iteration provides a more precise measurement.

8. The apparatus of claim 1,
wherein the illuminator illuminates the scene using a ToF light source modulated at a first modulation frequency, and
wherein the image signal processor is further configured to:
measure depths to respective surface points within the scene using the first modulation frequency, the surface points being represented by a plurality of respective pixels;
compute at least one statistical distribution parameter for the depths;
determine a second modulation frequency higher than the first modulation frequency based on the at least one statistical distribution parameter; and
remeasure depths of the RoI using the second modulation frequency in the second ToF measurement.

9. The apparatus of claim 8, wherein the at least one statistical distribution is a standard deviation of the depths.

10. The apparatus of claim 1, wherein the touchscreen interface selects the RoI in a RoI depth mode to perform depth measurements over the RoI.

11. An operating method of an apparatus having at least one time-of-flight (ToF) camera, comprising,
performing a first ToF measurement of a scene using a first modulation frequency;
selecting a Region of Interest (RoI) of the scene through a touchscreen interface;
identifying the RoI through the touchscreen interface;
performing a second ToF measurement of the RoI using a first modulation frequency; and
outputting depth information with a precision different from the first ToF measurement.

12. The operating method of claim 11, wherein the performing the first ToF measurement includes:
illuminating the scene using a ToF light source modulated at the first modulation frequency; and
measuring depths to respective surface points within the scene using the first modulation frequency, the surface points being represented by a plurality of respective pixels.

13. The operating method of claim 12, wherein the performing the second ToF measurement includes:
computing at least one statistical distribution parameter for the depths;
determining the second modulation frequency higher than the first modulation frequency based on the at least one statistical distribution parameter; and
remeasuring depths of the RoI using the second modulation frequency.

14. The operating method of claim 13, wherein further comprising:
recomputing the statistical distribution parameter for the depths that were remeasured;
determining whether the recomputed statistical parameter is above or below a threshold corresponding to a target depth accuracy;
providing the remeasured depths using the second modulation frequency as final measured depths when the recomputed statistical parameter is below the threshold;
determining a third modulation frequency higher than the second modulation frequency based on the recomputed statistical distribution parameter when the recomputed statistical parameter is above the threshold; and
remeasuring the depths of the RoI using the third modulation frequency.

15. The operating method of claim 11, further comprising activating an RoI depth mode of the ToF camera.

16. A time-of-flight (ToF) camera embedded on a smart phone comprising:
an illuminator configured to illuminate a scene with modulated light;
an image sensor having pixels to capture the modulated light reflected from surface points in the scene and output voltages representing the same; and
an image signal processor configured to:
identify a region of interest (RoI) through a touchscreen interface in a second ToF measurement of the RoI;
measure depths of the RoI by performing ToF operations using the modulated light; and
output depth information with a precision different from a first ToF measurement of the RoI.

17. The ToF camera of claim 16, wherein the modulated light includes infrared light, wherein a second modulation frequency of the second ToF measurement is higher than a first modulation frequency of the first ToF measurement.

18. The ToF camera of claim 17, wherein the image signal processor measures first depths of the RoI based on a first ToF light source in the first ToF measurement and second depths of the RoI based on a second ToF light source in the second ToF measurement, and determines the second modulation frequency based on at least one statistical distribution parameter for the first depths.

19. The ToF camera of claim 16, wherein the illuminator illuminates the scene using a first ToF light source modulated at a first modulation frequency and illuminates the RoI using a second ToF light source modulated at a second modulation frequency.

20. The ToF camera of claim 16, wherein the image signal processor is further configured to:

measure depths to respective surface points within the scene using a first modulation frequency, the surface points being represented by a plurality of respective pixels;

compute at least one statistical distribution parameter for the depths;

determine a second modulation frequency based on the at least one statistical distribution parameter; and remeasure depths of the RoI using the second modulation frequency.

* * * * *